(12) United States Patent
Ladouceur et al.

(10) Patent No.: US 8,469,749 B2
(45) Date of Patent: Jun. 25, 2013

(54) TWO-PART JACK SOCKET FOR A PORTABLE ELECTRONIC DEVICE

(75) Inventors: Norman Miner Ladouceur, Waterloo (CA); Jason Tyler Griffin, Kitchener (CA)

(73) Assignee: Research In Motion Limited, Waterloo (CA)

( * ) Notice: Subject to any disclaimer, the term of this patent is extended or adjusted under 35 U.S.C. 154(b) by 108 days.

(21) Appl. No.: 12/971,039

(22) Filed: Dec. 17, 2010

(65) Prior Publication Data

US 2012/0156907 A1 Jun. 21, 2012

(51) Int. Cl.
*H01R 24/04* (2006.01)

(52) U.S. Cl.
USPC .......................................................... 439/668

(58) Field of Classification Search
USPC ................. 439/188, 668, 669, 858; 200/51.1, 200/51.12
See application file for complete search history.

(56) References Cited

U.S. PATENT DOCUMENTS

| | | | |
|---|---|---|---|
| 4,426,558 A | 1/1984 | Tanaka et al. | |
| 4,633,048 A | 12/1986 | Komatsu | |
| 4,911,652 A * | 3/1990 | Savoca et al. | 439/282 |
| 4,937,404 A | 6/1990 | Kitagawa | |
| 5,230,552 A | 7/1993 | Schipper et al. | |
| 5,634,802 A | 6/1997 | Kerklaan | |
| 5,727,972 A | 3/1998 | Aldous et al. | |
| 6,224,408 B1 | 5/2001 | Wu | |
| 6,290,518 B1 | 9/2001 | Byrne | |
| 6,561,824 B1 | 5/2003 | Beckham et al. | |
| 6,755,694 B2 | 6/2004 | Reis et al. | |
| 6,942,502 B2 | 9/2005 | Sharples | |
| 6,979,209 B2 | 12/2005 | Griepentrog | |
| 7,039,393 B1 | 5/2006 | Kite | |
| 7,244,129 B2 | 7/2007 | Reid et al. | |
| 7,374,437 B2 | 5/2008 | Reid et al. | |
| 7,452,220 B2 | 11/2008 | Reid et al. | |
| 7,934,932 B1 | 5/2011 | Lee et al. | |
| 2003/0114039 A1 | 6/2003 | Homer | |
| 2008/0032562 A1 | 2/2008 | McHugh et al. | |
| 2008/0064238 A1 | 3/2008 | Reid et al. | |

(Continued)

FOREIGN PATENT DOCUMENTS

| | | | |
|---|---|---|---|
| DE | 10 2008 063110 A1 | 7/2010 | |
| EP | 1265421 A1 | 12/2002 | |

(Continued)

OTHER PUBLICATIONS

Extended European Search Report, EP 10195601.9, May 31, 2011.

(Continued)

*Primary Examiner* — Khiem Nguyen
(74) *Attorney, Agent, or Firm* — Ridout & Maybee LLP

(57) ABSTRACT

The present disclosure provides a two-part jack socket for a portable electronic device and a portable electronic device having the same. In accordance with one example embodiment, the jack socket comprises: a first part having a contact surface; a second part having a contact surface and being moveable with respect to the first part between a first position and a second position, the contact surfaces of the first part and second part defining a cavity, the cavity having a retracted state when the second part is in the first position and an expanded state for receiving a jack plug when the second part is in the second position; and one or more contacts located in the contact surface of the first part or second part.

20 Claims, 14 Drawing Sheets

U.S. PATENT DOCUMENTS

| | | |
|---|---|---|
| 2008/0299835 A1 | 12/2008 | Lin et al. |
| 2009/0149053 A1 | 6/2009 | Chansrivong |
| 2009/0209306 A1 | 8/2009 | Griffin |
| 2010/0195288 A1 | 8/2010 | Byrne |
| 2010/0215183 A1 | 8/2010 | Hansson |
| 2011/0508319 | 3/2011 | Kim |

FOREIGN PATENT DOCUMENTS

| | | |
|---|---|---|
| EP | 1610420 A2 | 12/2005 |
| EP | 2239928 A1 | 10/2010 |
| JP | 9 326279 | 12/1997 |
| KR | 20-2007-0000534 U | 5/2007 |
| KR | 20070120227 A | 12/2007 |

OTHER PUBLICATIONS

Extended European Search Report; EP 10195602.7; dated Sep. 23, 2011.

\* cited by examiner

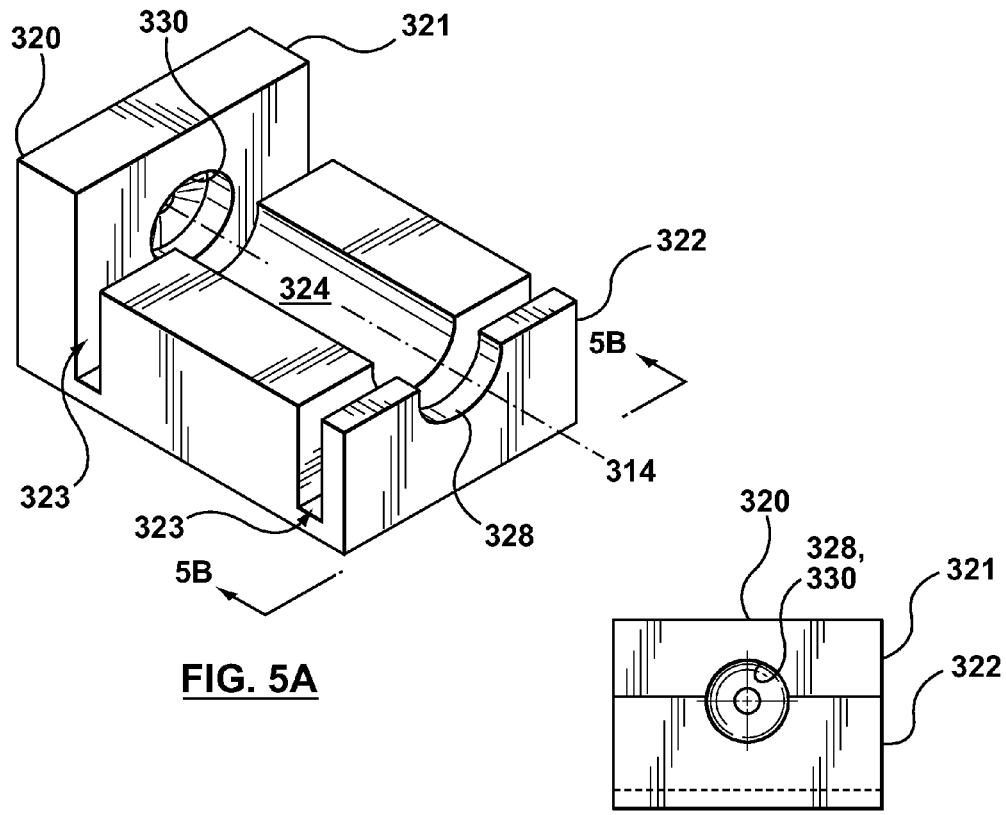
FIG. 5A
FIG. 5B
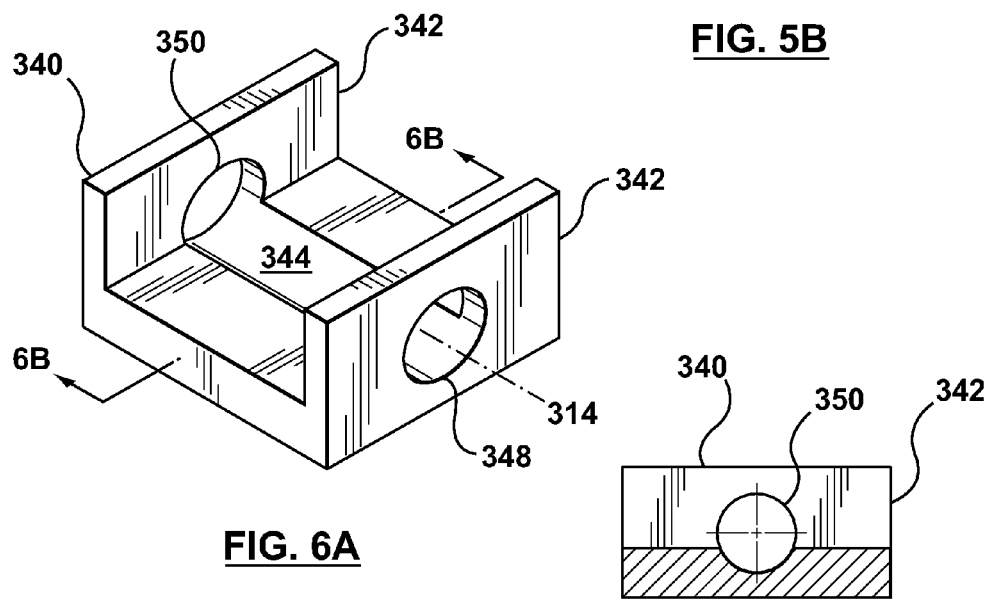
FIG. 6A
FIG. 6B

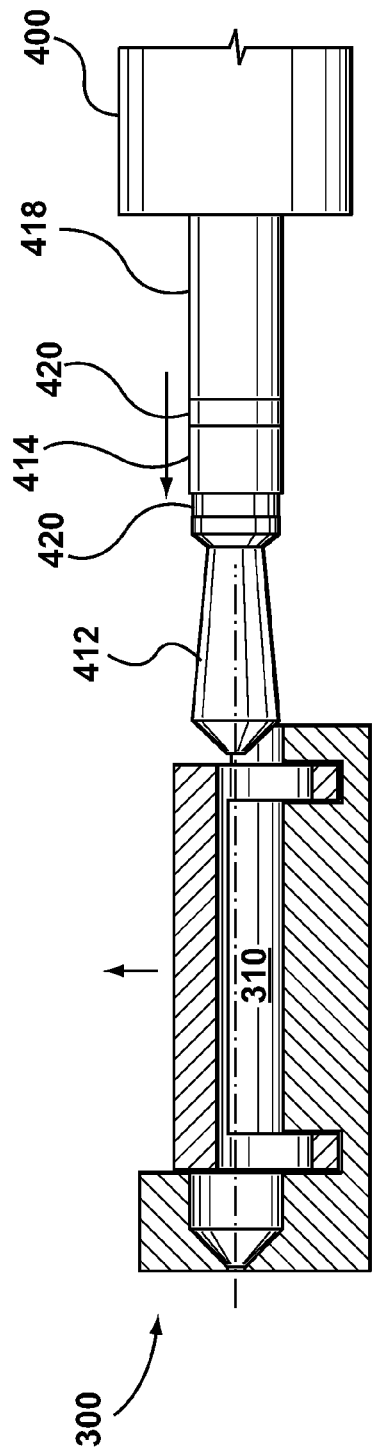
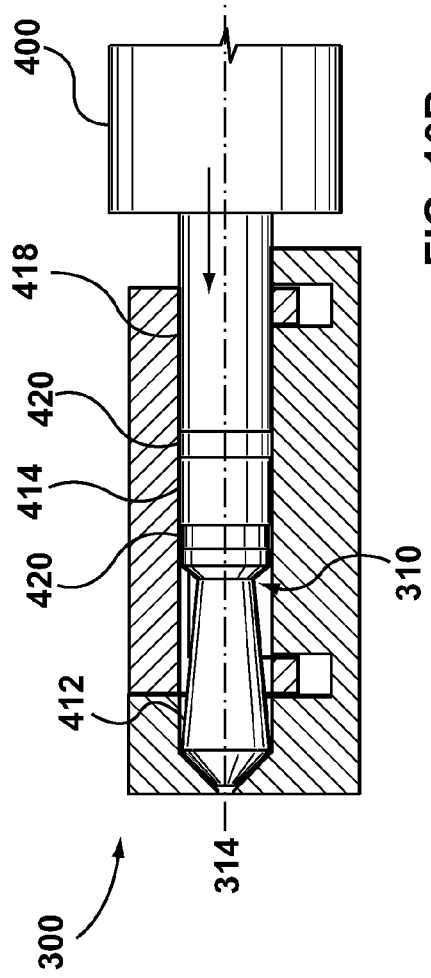
FIG. 10A
FIG. 10B

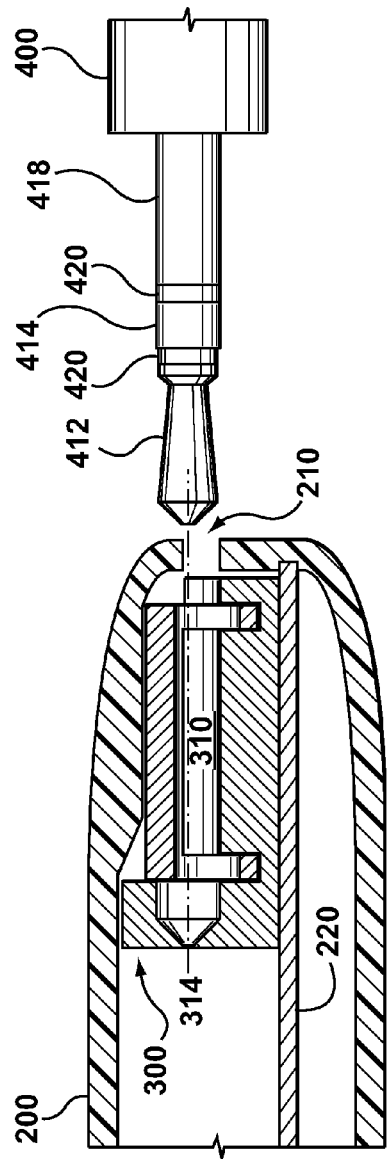
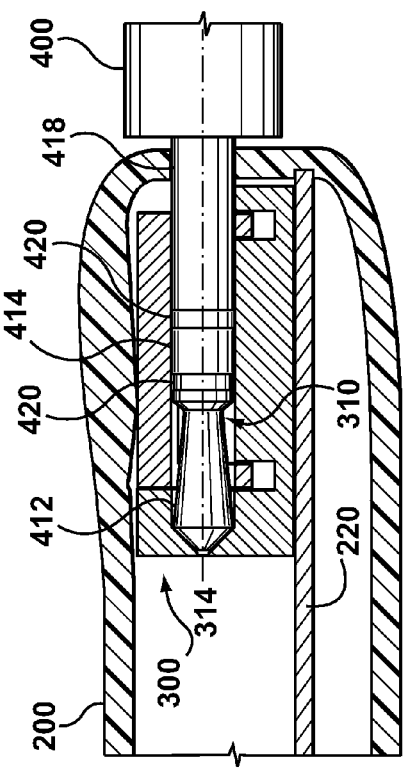
FIG. 11A
FIG. 11B

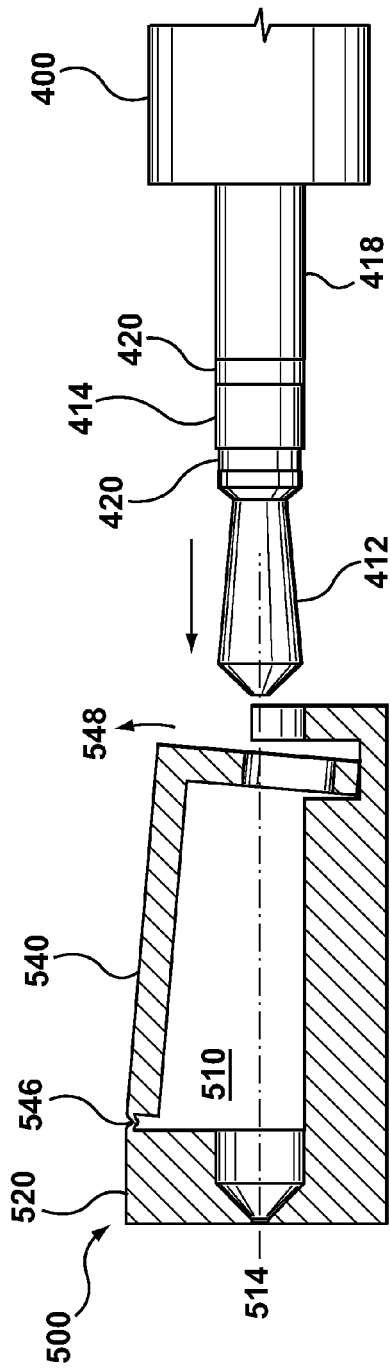
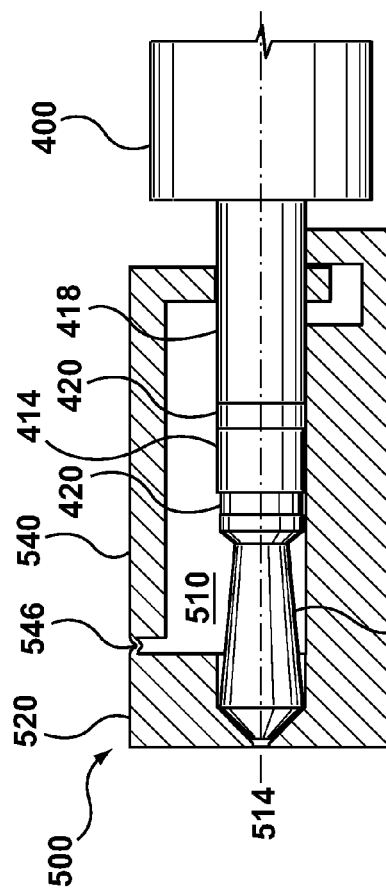
FIG. 14A
FIG. 14B

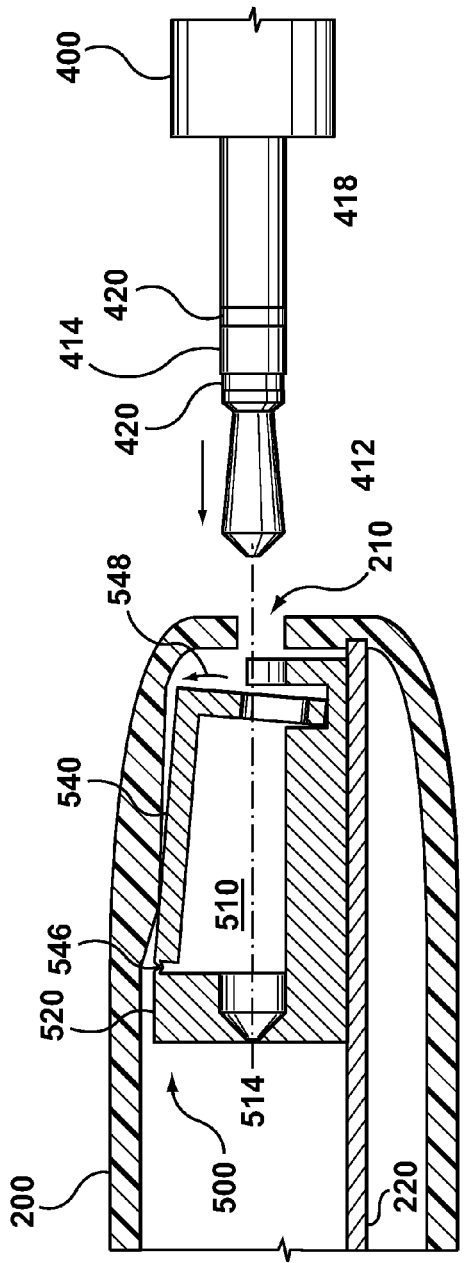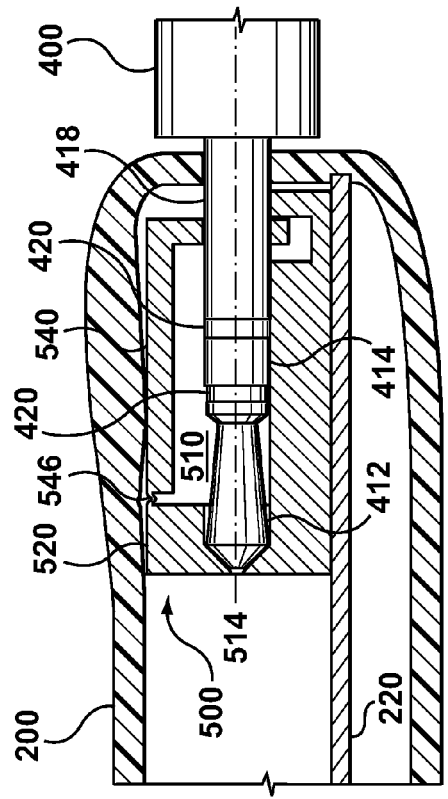

US 8,469,749 B2

TWO-PART JACK SOCKET FOR A PORTABLE ELECTRONIC DEVICE

TECHNICAL FIELD

The present disclosure relates to jacks, and more particularly to a two-part jack socket for a portable electronic device.

BACKGROUND

Electronic devices, including portable electronic devices, often have audio jacks for receiving an audio plug of an audio accessory such as headphones, a headset, amplified speakers or amplified headphones. Audio jacks can be relatively large compared with other components of portable electronic devices and contribute to the thickness of host portable electronic devices in which the audio jacks are carried. Accordingly, alternative audio jacks which reduce the thickness of host portable electronic devices are desirable.

BRIEF DESCRIPTION OF THE DRAWINGS

FIG. 5A is a perspective view of a first part of a two-part jack socket in accordance with one example embodiment of the present disclosure;

FIG. 5B is an end view of the first part of the two-part jack socket of FIG. 5A taken along the line 5B-5B;

FIG. 6A is a perspective upside-down view of a second part of a two-part jack socket jack in accordance with one example embodiment of the present disclosure;

FIG. 6B is a cross-sectional view of the second part of the two-part jack socket of FIG. 6A taken along the line 6B-6B;

FIG. 10A is a cross-sectional view of the two-part jack socket formed by the first part and second part of FIGS. 5A and 5B with the jack socket in the retracted state;

FIG. 10B is a cross-sectional view of the two-part jack socket formed by the first part and second part of FIGS. 5A and 5B with the jack socket in the expanded state and a jack plug received therein;

FIG. 11A is a cross-sectional view of a portable electronic device carrying the two-part jack socket of FIG. 10A;

FIG. 11B is a cross-sectional view of a portable electronic device carrying the two-part jack socket of FIG. 10B;

FIG. 14A is a cross-sectional view of the two-part jack socket of FIG. 12A with the jack socket in the retracted state;

FIG. 14B is a cross-sectional view of the two-part jack socket of FIG. 13A with the jack socket in the expanded state and a jack plug received therein;

FIG. 15A is a cross-sectional view of a portable electronic device carrying the two-part jack socket of FIG. 12A with the jack socket in the retracted state; and FIG. 15B is a cross-sectional view of a portable electronic device carrying the two-part jack socket of FIG. 12A with the jack socket in the expanded state and a jack plug received therein.

DETAILED DESCRIPTION OF EXAMPLE EMBODIMENTS

Figure 1:
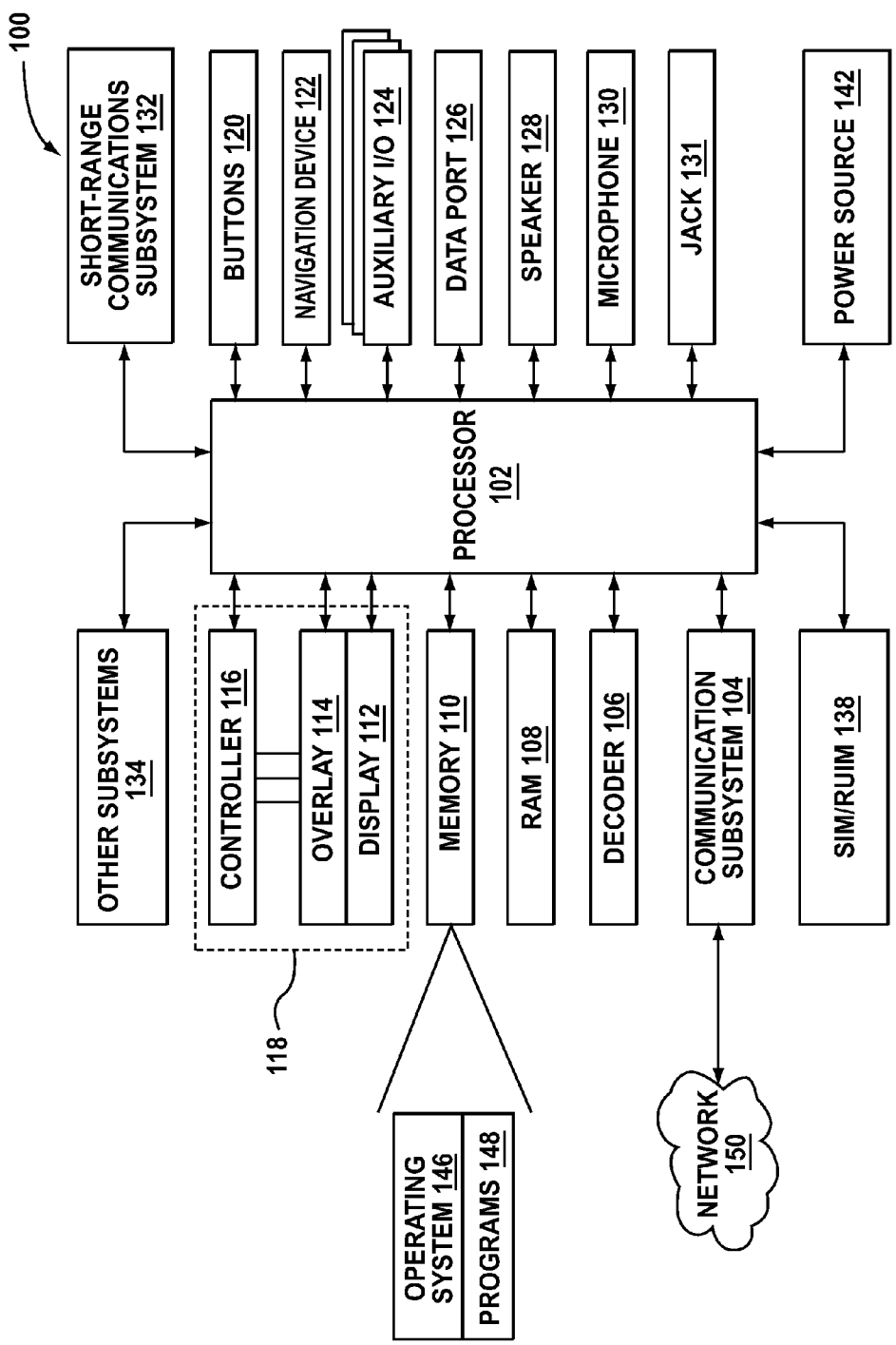
FIG. 1 is a simplified block diagram of components including internal components of a portable electronic device suitable for carrying out the example embodiments of the present disclosure.

The present disclosure generally relates to portable electronic devices which may be carried in a user's hands (i.e., handheld electronic devices) or may be moved or shaken by the user. Examples of portable electronic devices include, but are not limited to, pagers, mobile phones, smartphones, wireless organizers, PDAs, portable media players, portable gaming devices, Global Positioning System (GPS) navigation devices, electronic book readers, cameras, and notebook and tablet computers. Example embodiments of the present disclosure may be applied to other portable electronic devices not specifically described in the above examples.

In accordance with one example embodiment, there is provided a jack socket comprising: a first part having a contact surface; a second part having a contact surface and being moveable with respect to the first part between a first position and a second position, the contact surfaces of the first part and second part defining a cavity, the cavity having a retracted state when the second part is in the first position and an expanded state for receiving a jack plug when the second part is in the second position; and one or more contacts located in the contact surface of the first part or second part.

In accordance with another example embodiment, there is provided a jack socket comprising: a body having an elongate concave contact surface, the contact surface defining a first part of a cavity for receiving a jack plug; one or more contacts located in the contact surface of the body.

In accordance with a further example embodiment, there is provided a portable electronic device comprising: a circuit board; a jack socket comprising: a first part having a contact surface; a second part having a contact surface and being moveable with respect to the first part between a first position and a second position, the contact surfaces of the first part and second part defining a cavity, the cavity having a retracted state when the second part is in the first position and an expanded state for receiving a jack plug when the second part is in the second position; and one or more contacts located in the contact surface of the first part or second part, wherein the contacts are in electrical communication with the circuit board; a flexible casing surrounding the jack socket, the flexible casing defining a casing aperture, wherein the casing aperture has a first cross-sectional area when the cavity is in the retracted state and a second cross-sectional area when the cavity is in the expanded state.

In accordance with yet a further example embodiment, there is provided a portable electronic device comprising: a circuit board; a jack socket comprising: a body having an elongate concave contact surface; and one or more contacts located in the contact surface of the body, wherein the contacts are in electrical communication with the circuit board; a flexible casing surrounding the jack socket, the flexible casing having an inner surface with cooperates with the contact surface of the body to define a cavity for receiving a jack plug, wherein the cavity expands from a retracted state to an expanded state in response to insertion of the jack plug, and contracts from the expanded state to the retracted state in response to removal of the jack plug; wherein the flexible casing defines a casing aperture having a first cross-sectional area when the cavity is in the retracted state and a second cross-sectional area when the cavity is in the expanded state.

Reference will now be made to the accompanying drawings which show, by way of example, example embodiments of the present disclosure. For simplicity and clarity of illustration, reference numerals may be repeated among the Figures to indicate corresponding or analogous elements. Numerous details are set forth to provide an understanding of the example embodiments described herein. The example embodiments may be practiced without these details. In other instances, well-known methods, procedures, and components have not been described in detail to avoid obscuring the example embodiments described. The description is not to be considered as limited to the scope of the example embodiments described herein.

Reference is made to FIG. 1, which illustrates in block diagram form, a portable electronic device 100 to which example embodiments described in the present disclosure can be applied. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 (such as a liquid crystal display (LCD)) with a touch-sensitive overlay 114 coupled to an electronic controller 116 that together comprise a touch-sensitive display 118, one or keys or buttons 120, a navigation device 122, one or more auxiliary input/output (I/O) subsystems 124, a data port 126, a speaker 128, a microphone 130, a jack 131, a short-range communications subsystem 132, and other device subsystems 134. It will be appreciated that the electronic controller 116 of the touch-sensitive display 118 need not be physically integrated with the touch-sensitive overlay 114 and display 112. User-interaction with a graphical user interface (GUI) is performed through the touch-sensitive overlay 114. The GUI displays user interface screens on the touch-sensitive display 118 for displaying information or providing a touch-sensitive onscreen user interface element for receiving input. This content of the user interface screen varies depending on the device state and active application, among other factors. Some user interface screens may include a text field sometimes called a text input field. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102.

The jack 131 may be an audio jack for receiving an audio plug of an audio accessory such as, for example, headphones, a headset, amplified speakers or amplified headphones. Alternatively, the jack 131 may be configured for receiving jack plugs for other accessories or auxiliary I/O devices. The other accessories may include, for example, a multimedia accessory having multimedia inputs such as play, pause, stop, forward/rewind inputs, or a video output accessory that allows for connection of the portable electronic device 100 to a display such as television (TV) or monitor. Alternatively, the jack 131 may be a Universal Serial Bus (USB) port, FireWire port, RJ-11 port, RJ-45 port, memory card reader port for an SD card or other memory card, or other data port.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146, software applications (or programs) 148 that are executed by the processor 102, and data which are typically stored in a persistent, updatable store such as the memory 110. Additional applications or programs 148 may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data objects, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
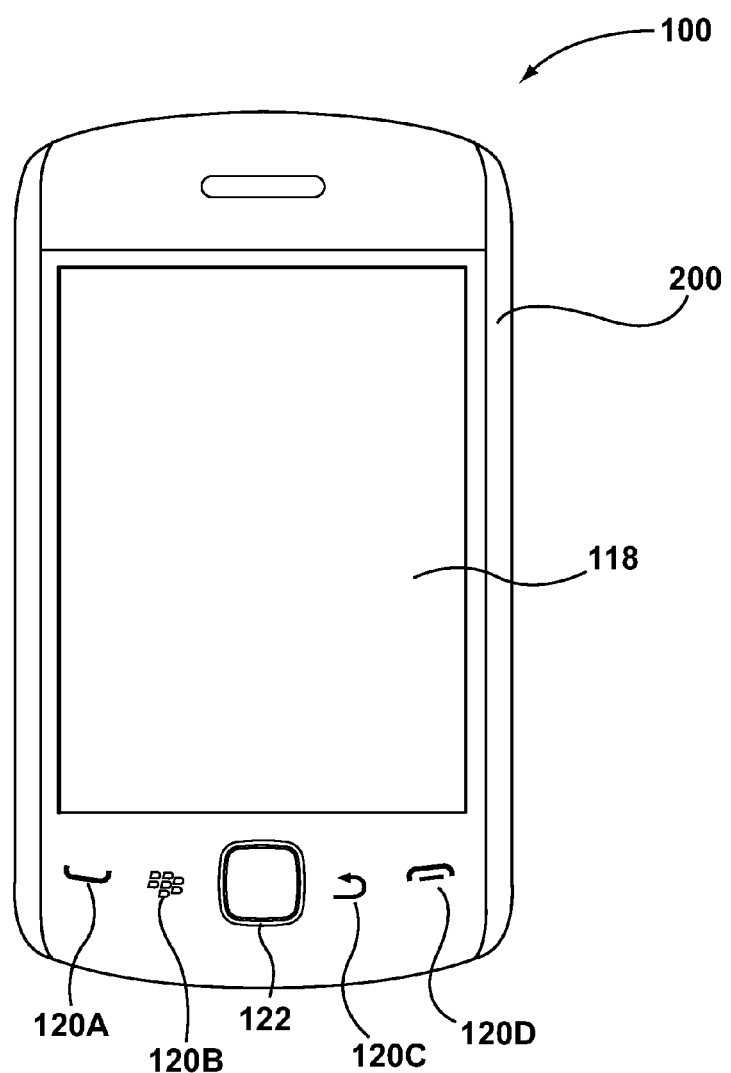
FIG. 2 is a front view of an example of a portable electronic device in a portrait orientation.

FIG. 2 shows a front view of an example of a portable electronic device 100 in portrait orientation. The portable electronic device 100 includes a housing 200 that houses internal components including internal components shown in FIG. 1 and frames the touch-sensitive display 118 such that the touch-sensitive display 118 is exposed for user-interaction therewith when the portable electronic device 100 is in use. It will be appreciated that the touch-sensitive display 118 may include any suitable number of user-selectable features rendered thereon, for example, in the form of virtual buttons for user-selection of, for example, applications, options, or keys of a keyboard for user entry of data during operation of the portable electronic device 100.

The buttons 120, represented individually by references 120A, 120B, 120C and 120D, are located below the touch-sensitive display 118 on a front face of the portable electronic device 100. The buttons 120 generate corresponding input signals when activated. The buttons 120 may be constructed using any suitable button (or key) construction such as, for example, a dome-switch construction. The actions performed by the device 100 in response to activation of respective buttons 120 are context-sensitive. The action performed depends on a context that the button was activated. The context may be, but is not limited to, a device state, application, screen context, selected item or function, or any combination thereof.

The navigation device 122 may be a depressible (or clickable) joystick such as a depressible optical joystick, a depressible trackball, a depressible scroll wheel, or a depressible touch-sensitive trackpad or touchpad. FIG. 2 shows the navigation device 122 in the form of a depressible optical joystick.

The auxiliary I/O subsystems 124 may include other input devices such as a keyboard and/or keypad (neither of which is not shown). In some example embodiments, a conventional a non-touch-sensitive display, such as an LCD screen, may be provided instead of the touch-sensitive display 118 along with a keyboard and/or keypad.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a centre of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

Figure 3A:
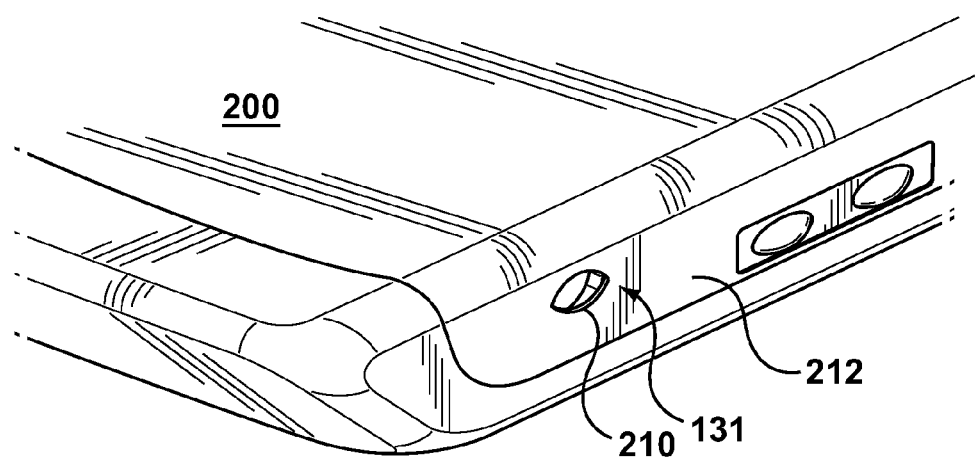
FIG. 3A is a partial perspective view of a portable electronic device having a jack socket in accordance with one example embodiment of the present disclosure with the jack socket in a retracted state.
Figure 3B:
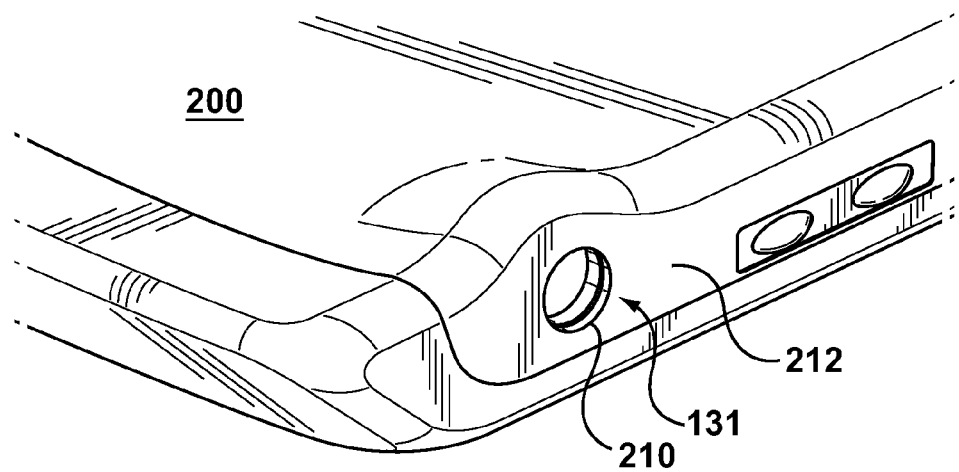
FIG. 3B is a partial perspective view of the portable electronic device of FIG. 3A with the jack socket in an expanded state.
Figure 4A:
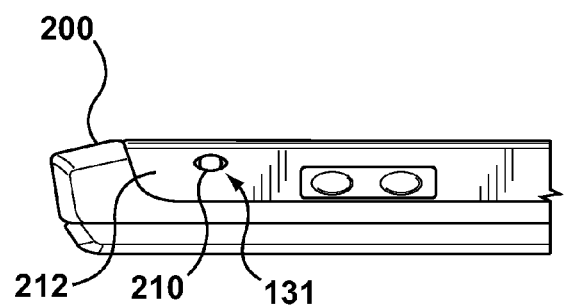
FIG. 4A is a partial side view of the portable electronic device in FIG. 3A.
Figure 4B:
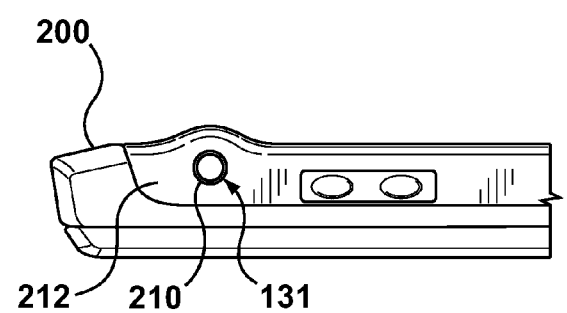
FIG. 4B is a partial side view of the portable electronic device in FIG. 3B.
Figure 7:
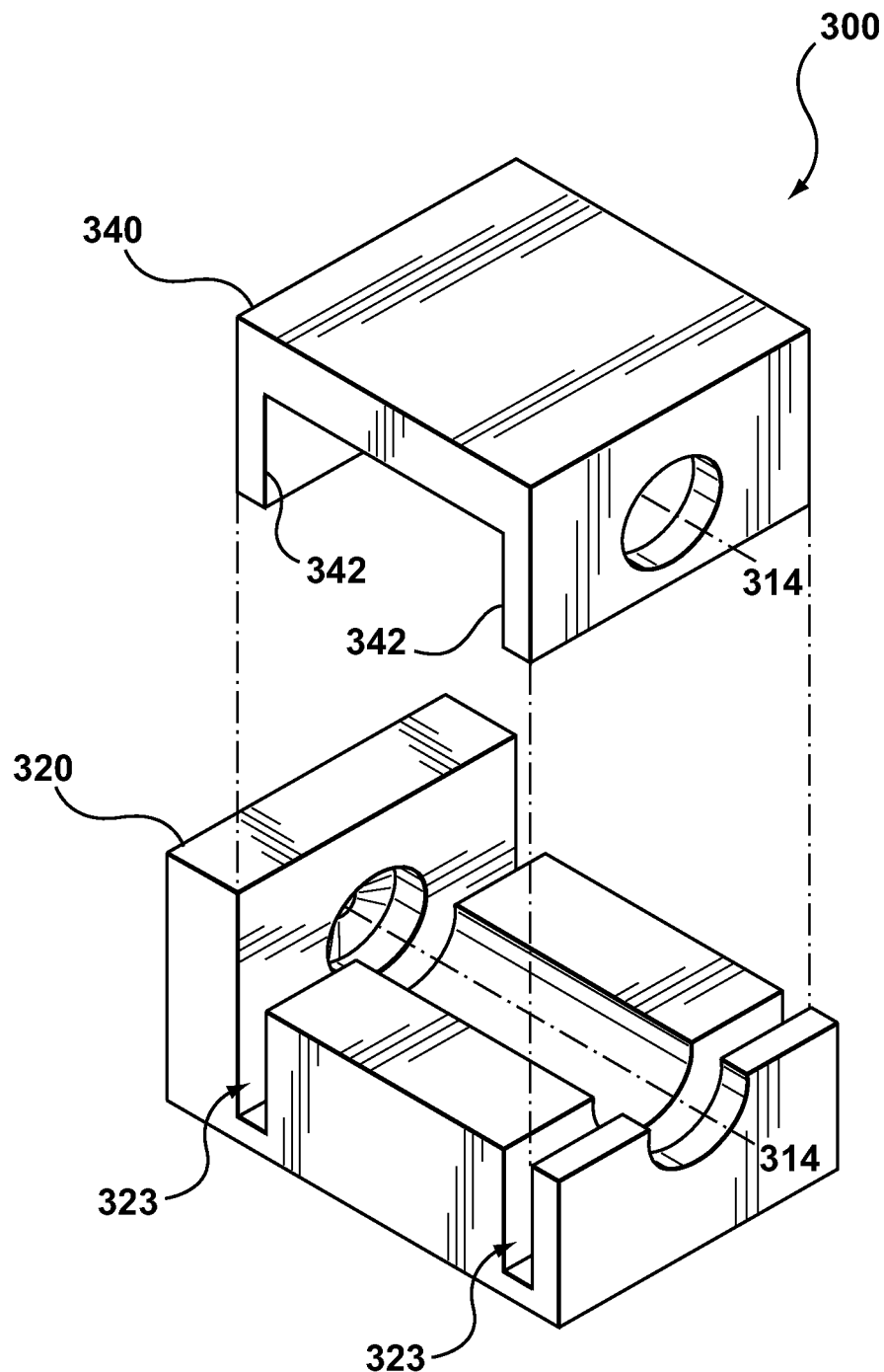
FIG. 7 is an exploded perspective view of a two-part jack socket jack formed by the first part and second part of FIGS. 5A and 6A.
Figure 8A:
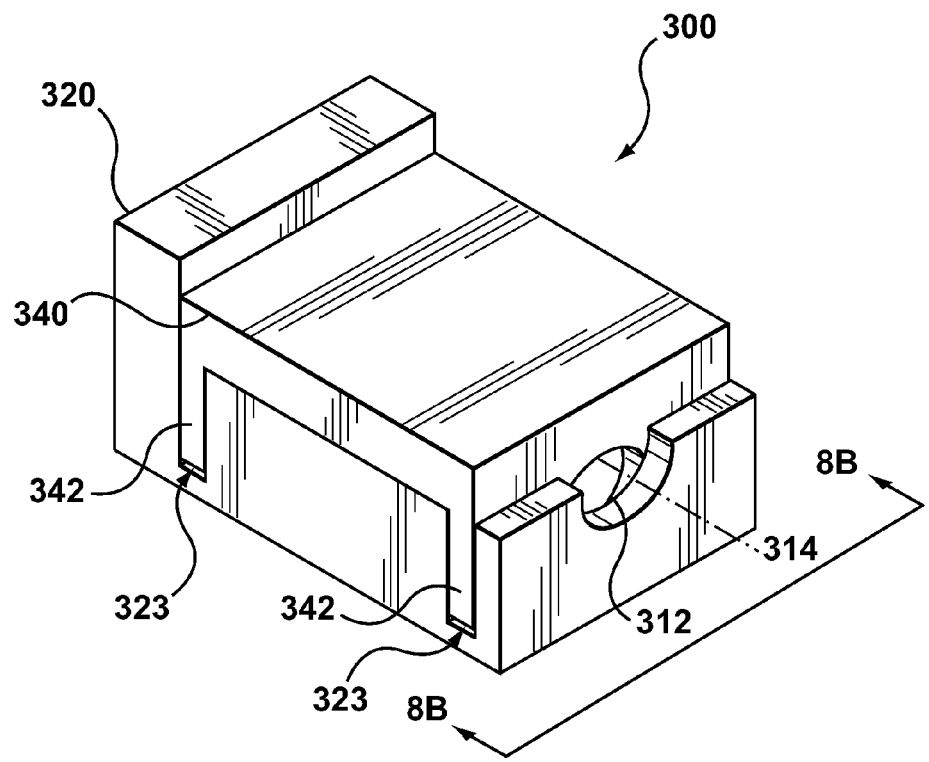
FIG. 8A is an perspective view of a two-part jack socket formed by the first part and second part of FIGS. 5A and 5B with the jack socket in the retracted state.
Figure 8B:
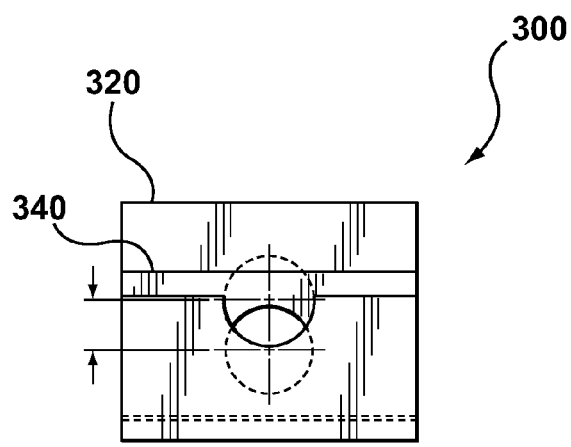
FIG. 8B is an end view of the two-part jack socket of FIG. 8A taken along the line 8B-8B.
Figure 9A:
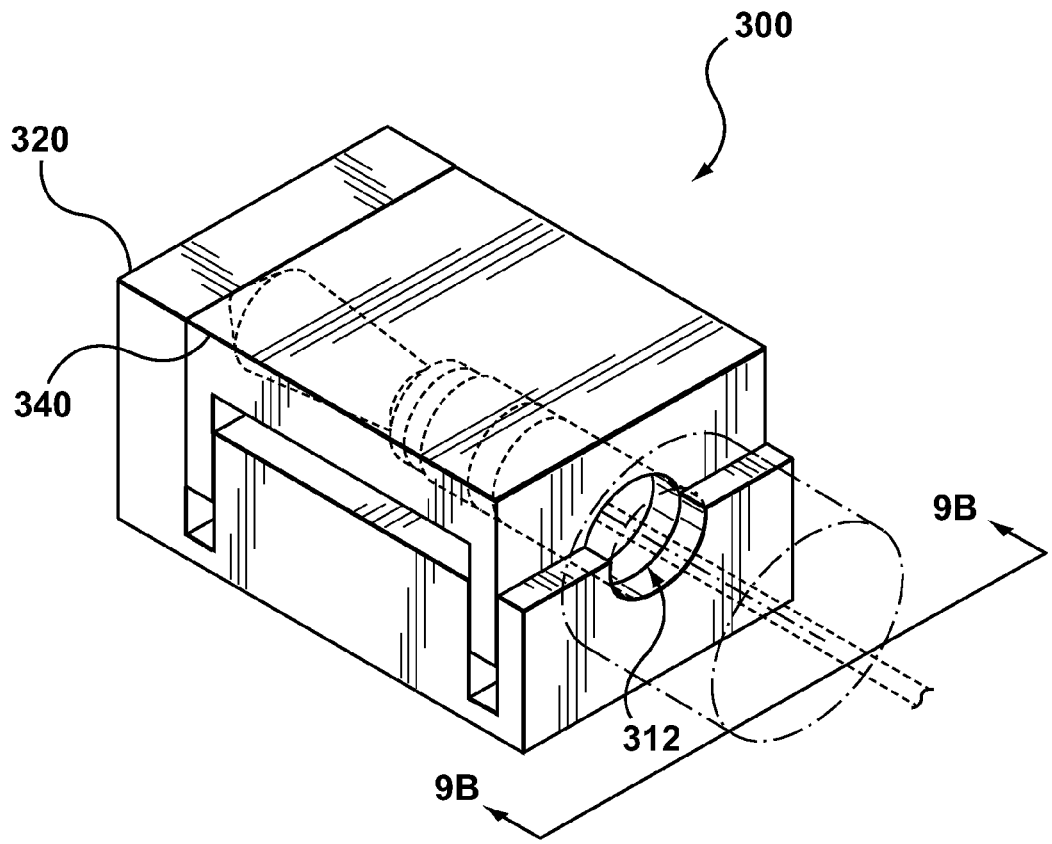
FIG. 9A is an perspective view of a two-part jack socket formed by the first part and second part of FIGS. 5A and 5B with the jack socket in the expanded state.
Figure 9B:
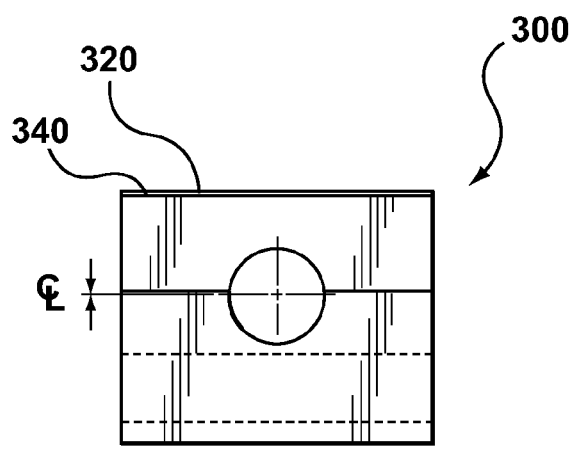
FIG. 9B is an end view of the two-part jack socket of FIG. 9A taken along the line 9B-9B.
Figure 12A:
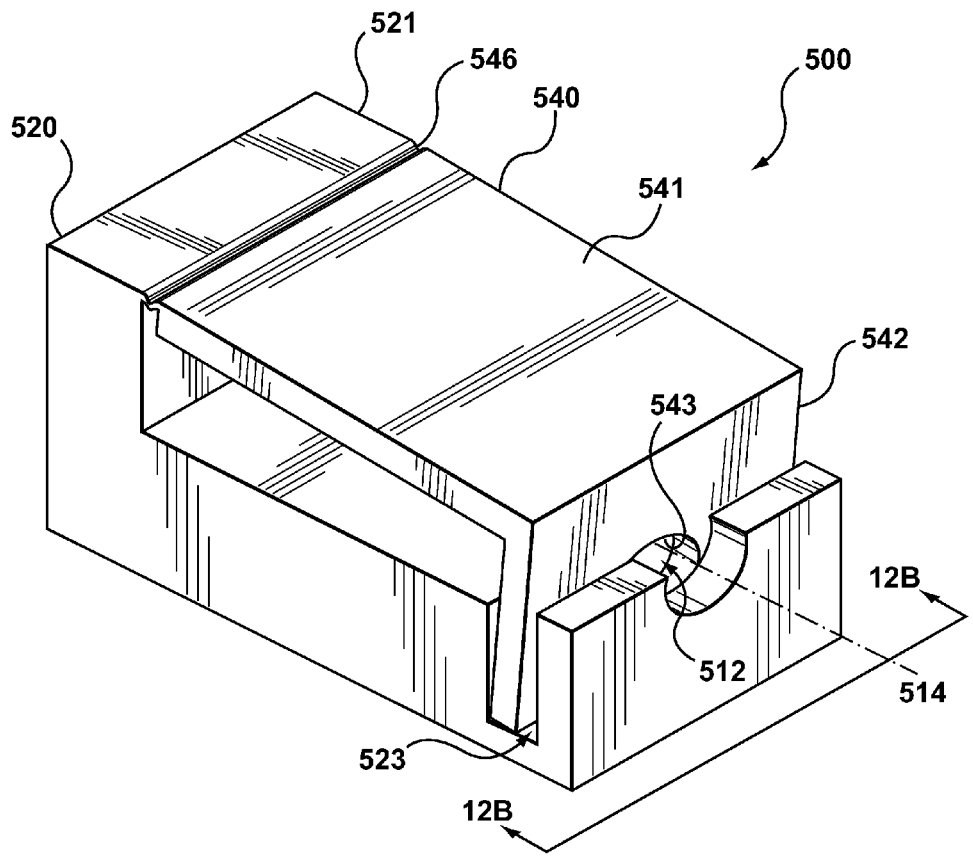
FIG. 12A is an perspective view of a two-part jack socket in accordance with a second example embodiment of the present disclosure with the jack socket in a retracted state.
Figure 12B:
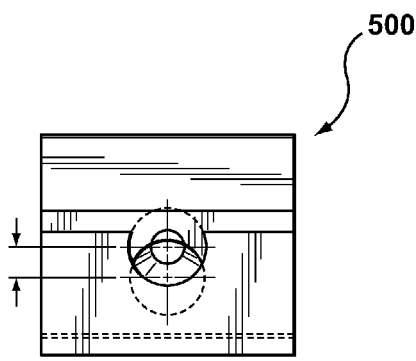
FIG. 12B is an end view of the two-part jack socket of FIG. 12A taken along the line 12B-12B.

FIGS. 3A and 3B illustrate one example of the portable electronic device 100 having a two-part jack socket in accordance with one embodiment of the present disclosure. The two-part jack socket may be used to provide the jack 131 of the portable electronic device 100 described above. The jack 131 is provided in an aperture 210 in a side surface 212 of the housing 200. The jack 131 has a retracted state as shown in FIGS. 3A and 4A and an expanded state as shown in FIGS. 3B and 4B. The jack 131 defines a cavity which is configured to receive a jack plug in the expanded state. The jack 131 can be changed from the retracted state to the expanded state in response to insertion of the jack plug, and from the expanded state to the retracted state in response to removal of an inserted jack plug, as described below. The aperture 210 enlarges when the jack 131 changes from the retracted state to the expanded state and contracts when the jack 131 changes from the expanded state to the retracted state.

Referring now to FIGS. 5A to 11B, a two-part jack socket 300 in accordance with one example embodiment of the present disclosure will now be described. The two-part jack socket 300 can be used to provide the jack 131 of the portable electronic device 100 shown in FIGS. 3A to 4B and described above. The jack socket 300 comprises a first part 320 having an inner contact surface 324 and a second part 340 having an inner contact surface 344. The second part 340 is moveable with respect to the first part 320 between a first position and a second position. The contact surfaces 324, 344 of the first part 320 and second part 340 define a cavity 310. The cavity 310 has a retracted state when the second part 340 is in the first position and an expanded state for receiving a jack plug such as an audio plug when the second part 340 is in the second position.

The cavity 310 has an aperture 312 and extends along a longitudinal axis 314 of the jack socket 300. In the shown example, the cavity 310 is shaped to accommodate an inserted jack plug of the TRS ("tip-ring-sleeve"), TRRS ("tip-ring-ring-sleeve") or TS ("tip-sleeve") variety when the cavity 310 is in the expanded state. The shape of the cavity 310 in the expanded state is substantially complementary to the shape of the jack plug. As noted above, the side surface 212 of the housing 200 of the portable electronic device 100 defines an aperture 210 through which a jack plug can be inserted into the cavity 310 along the longitudinal axis 314 of the cavity 310. The aperture 210 enlarges when the jack 131 changes from the retracted state to the expanded state and contracts when the jack 131 changes from the expanded state to the retracted state.

Referring now to FIGS. 11A and 11B, select features of the portable electronic device 100 will be described. The housing 200 of the portable electronic device 100 comprises a flexible casing which is formed of a flexible material. The flexible casing may be any suitable flexible material including, but not limited to, a suitable urethane, neoprene or silicone rubber. The flexible casing surrounds the jack socket 300 and circuit board 220 and defines a casing aperture 210 in which a jack plug can be received. The jack plug may be inserted through the casing aperture 210 into the cavity 310 along the longitudinal axis 314 of the cavity 310. The casing aperture 210 has a first cross-sectional area when the cavity 310 is in the retracted state (FIG. 11A) and a second cross-sectional area when the cavity is in the expanded state (FIG. 11B). The circuit board 220 may be attached to a frame (not shown) which provides an internal structure of the portable electronic device 100. The flexible casing also surrounds the frame of the portable electronic device 100. The flexible casing applies an inward restraining (or biasing) force which biases or "preloads" the jack socket 300 into the retracted position and releasably secures an inserted received jack plug. The flexible casing may take up the entire housing 200, or may be only a portion of the housing 200.

The cavity 310 expands from the retracted state to the expanded state in response to insertion of the jack plug. The tip of the jack plug enters the aperture 210 in the side surface 212 of the housing 200 and the aperture 312 in the jack socket 300. As the jack plug proceeds into the cavity 310, its increasing cross-section contacts and displaces the second part 340, acting against the inward restraining force of the flexible casing. This moves the second part 340 away from the first part 320 in a direction perpendicular to the longitudinal axis 314 of the cavity 310. This moves the second part 340 into the second position. Conversely, the cavity 310 contracts from the expanded state to the retracted state in response to removal of an inserted jack plug. As the jack plug is removed from the cavity 310, its decreasing cross-section gradually discontinues acting against the inward restraining force of the flexible casing. The inward restraining force of the flexible casing then biases the second part 340 towards the first part 320 in the direction perpendicular to the longitudinal axis 314 of the cavity 310. This returns the second part 340 to the first position.

The cavity 310 has a first cross-sectional area when the cavity 310 is in the retracted state and a second cross-sectional area when the cavity 310 is in the expanded state. The second cross-sectional area of the cavity 310 when in the expanded state is at least as large as a sleeve (or body) of a jack plug and the first cross-sectional area of the cavity 310 when in the retracted state is smaller than the sleeve of the jack plug. In the shown example, the contact surface 324 of the first part 320 and the contact surface 344 of the second part 340 are elongate concave surfaces. The cross-sectional area of the cavity 310 in the expanded state is generally circular and is close to the diameter of a sleeve or body of the mating jack plug.

The second part 340 may be adapted for sliding movement between the first position and the second position. In the shown example, the sliding movement may be provided by a complementary tracks (or rails) 342 and grooves 323 in the first part 320 and second part 320. As best shown in FIGS. 5A to 8B, the one of the first and second parts 320, 340 includes tracks 342 and the other of the first and second parts 320, 340 defines grooves 343 for receiving the tracks for sliding movement therein. In the shown example, a pair of tracks 342 is provided by the second part 340 and a pair of grooves 323 is provided by the first part 320. A different number of tracks 342 and grooves 323 may be provided in other embodiments. Similarly, the tracks 342 may be provided by the first part 320 and the grooves 323 may be provided by the second part 340 in other embodiments.

One or more electrical contacts (not shown) adapted to electrically communicate with corresponding contacts of an inserted jack plug are located in the cavity 310. The electrical contacts may be located in or on the contact surface 324 of the first part 320 or the contact surface 344 of the second part 340. In some embodiments, the electrical contacts are located in the contact surface 324 of the first part 320. The first part 320 is fixed relative to the portable electronic device 100 whereas the second part 340 is moveable relative to the first part 320. Locating the electrical contacts in the contact surface 324 of the first part 320 may simplify the design of the electrical contacts in the cavity 310 by locating the electrical contacts in the fixed part.

The electrical contacts are connected to a printed circuit board 220 (FIG. 11A, 11B) of the portable electronic device 100 which, for example, may be a rigid printed circuit board (PCB) or a flexible PCB attached to a stiffener or substrate. The electrical contacts in the cavity 310 may extend into spring contacts adapted to connect to the surface of the PCB 220. Each of the spring contacts may be an extension of one or more of the electrical contacts in the cavity 310. Alternatively, one or more of these spring contacts may be an extension of an electrical component within the jack socket 300 other than one of the electrical contacts of the cavity 310.

An example jack plug 400 for use with the jack socket 300 is shown in FIGS. 10A to 11B. The jack plug 400 includes a number of electrical contacts for establishing electrical communication with the electrical contacts of the cavity 310 in the jack socket 300. The electrical contacts of the jack plug 400 may be used for a variety of electrical connections with the jack socket 300 depending on the type of jack plug with which it is to be used, such as a mono audio signal or stereo audio signals, a microphone signal, and a ground. In the shown example, the jack plug 400 is of a TRS type having a cylindrical sleeve separated by insulating rings 420 to provide three separate electrical contacts at the tip 412, ring, 414 and sleeve 418. The electrical contact closest to the base of the jack plug 400 is the sleeve contact 418. The sleeve contact 418 is separated by a first insulating ring 420 from the ring contact 414, which is in turn separated by a second insulating ring 420 from the tip contact 412 at the distal end 402 of the jack plug 400.

In the example described above, the sleeve contact 418 is in electrical communication with a first electrical contact in the cavity 310 when the jack plug 400 is fully inserted into the cavity 310, the ring contact 414 is in electrical communication with a second electrical contact in the cavity 310 when the jack plug 400 is fully inserted into the cavity 310, and the tip contact 412 is in electrical communication with a third electrical contact in the cavity 310 when the jack plug 400 is fully inserted into the cavity 310. This provides an electrical communication path between the jack socket 300 and the jack plug 400.

In some embodiments, the different plug contacts may carry various audio signals, including speaker or headphone audio signals and/or microphone audio signals. When the jack plug 400 is a stereo audio plug, the tip contact 412 may carry a left channel audio signal, the ring contact 414 may carry a right channel audio signal, and the sleeve contact 418 may serve as a grounding contact connecting the jack plug 400 to a system ground or separate audio ground for the portable electronic device 100.

In the shown example, the rear end 321 of the first part 320 provides a detent or stop for an inserted jack plug. The stop may be provided by the second part 340 in other embodiments. The rear end 321 resists forward movement of a jack plug inserted along the longitudinal axis 314 of the cavity 310. In the shown example, the detent or stop is provided by a chamfered rear end 321 of the cavity 310 having a shape complementary to the tip 412 of the jack plug 400. When the tip 412 of the jack plug 400 comes into contact with the rear end 321 of the cavity 310, any further force of insertion along the longitudinal axis 314 of the cavity 310 is resisted. The side surface 212 opposite the jack plug 400 also provides a stopping surface.

The two-part jack socket 300 allows a thinner device profile in the first position (e.g., retracted position) when a jack plug is not inserted and the cavity 310 is in the retracted state than would otherwise be needed to accommodate a traditional non-expanding jack socket. This allows the overall device profile (thickness) to be reduced. While a lump or other enlarged area is formed when jack plug is inserted, that lump is only visible while the jack plug is in the two-part jack socket 300 and is largely hidden by the jack plug. The flexible casing allows the device housing 200 to expand without which a thinner device profile would need an enlarged area to accommodate physical space required to surround the jack socket. The thinner device profile may also provide protection from foreign objects such as dirt from entering the cavity 310 and interfering with electrical communication between electrical contacts. Additionally, the local area surrounding the jack socket is chamfered, tapered or rounded providing a more streamlined device profile. This also avoids a hard corner at the edge of the portable electronic device 100 protecting users and objects from abrasion.

The first part 320 and second part 340 are made of a rigid plastic such as, for example, a suitable polycarbonate plastic. The contacts in the cavity 310 of the two-part jack socket 300 are made of a suitable electrically conducting material such as, for example, gold.

In an alternative embodiment, the second part 340 may be part of the flexible casing of the housing 200. The second part 340 and the flexible casing may be co-molded together to form a single integrated part. The integrated part may be formed, for example, using injection or compression molding. The second part 340 may be made of a rigid plastic, such as a suitable polycarbonate plastic, and the flexible casing may be made from a flexible material, such as a suitable urethane, neoprene, silicone rubber or other flexible material which are fused to together to form a single integrated part using a two-shot injection or compression molding process.

In another alternative embodiment, the second part 340 may be omitted to provide a two-part jack socket (not shown). The two-part jack socket comprises a body similar to the first part 320 described above with the notable exception that the grooves 323 of the first part 320 may be omitted from the body. The body comprises an elongate concave (inner) contact surface 324 similar to the first part 320. One or more contacts are located in the contact surface 324 of the body as in the first part 320. In this example embodiment, the flexible casing has an inner surface with cooperates with the contact surface of the body to define a cavity for receiving a jack plug. The flexible casing replaces the second part 340 in defining the cavity of the two-part jack socket. The contact surface 324 of the body defines a first part of a cavity for receiving a jack plug. The second part of the cavity is an inner surface of the flexible casing.

The cavity 310 has a retracted state when a jack plug is not received in the cavity and an expanded state when a jack plug is received in the cavity. The cavity 310 expands from the retracted state to the expanded state in response to insertion of the jack plug. Conversely, the cavity 310 contracts from the expanded state to the retracted state in response to removal of the jack plug.

Referring now to FIGS. 12A to 15B, a two-part jack socket 500 in accordance with a second example embodiment of the present disclosure will now be described. The two-part jack socket 500 is similar to the two-part jack socket 300 except that the second part is pivotably connected to the first part so as to pivot between the first position and the second position. In contrast, the second part 340 of the two-part jack socket 300 is moveable relative the first part 320 in a direction perpendicular to the longitudinal axis 314 of the cavity 31 and may, for example, be adapted for sliding movement between the first position and the second position.

The two-part jack socket 500 can be used to provide the jack 131 of the portable electronic device 100 shown in FIGS. 3A to 4B and described above and as an alternative to the two-part jack socket 300. The jack socket 500 comprises a first part 520 having an inner contact surface 524 and a second part 540 having an inner contact surface 544. The contact surfaces 524, 544 of the first part 520 and second part 540 define a cavity 510. The cavity 510 has an aperture 512 and extends along a longitudinal axis 514 of the jack socket 500. The cavity 510 has a retracted state when the second part 540 is in the first position and an expanded state for receiving a jack plug such as an audio plug when the second part 540 is in the second position.

Figure 13A:
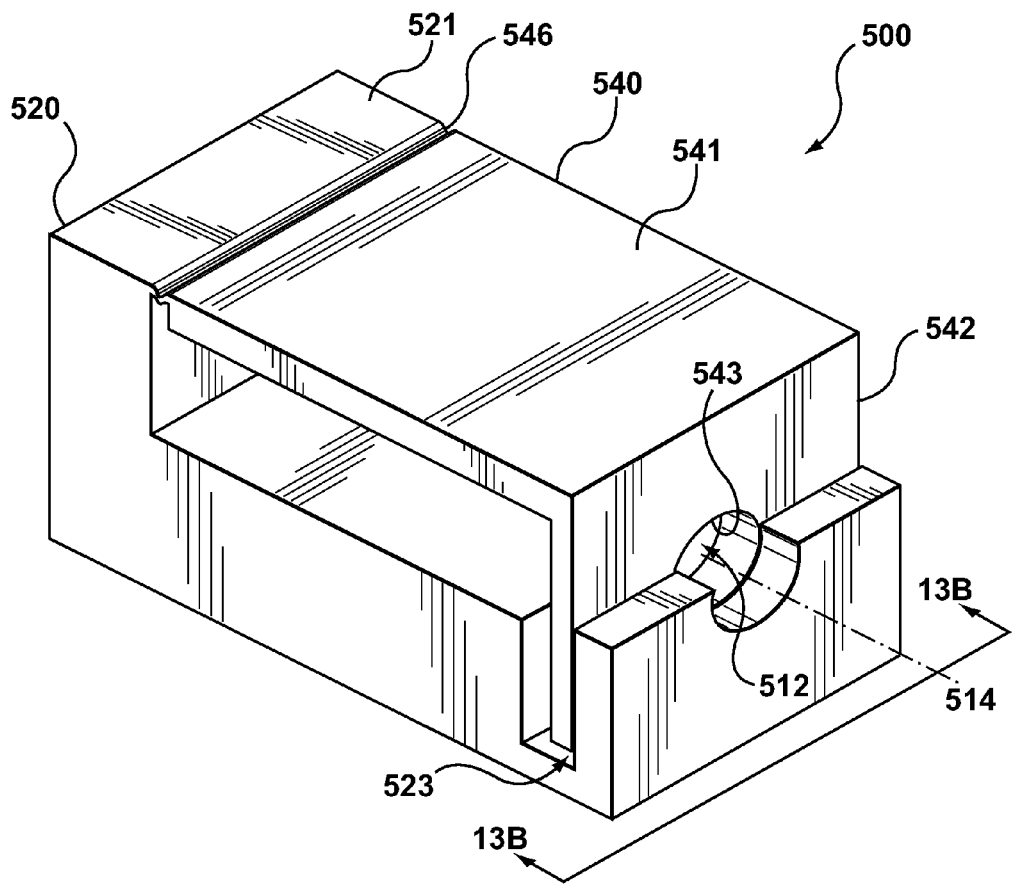
FIG. 13A is an perspective view of a two-part jack socket in accordance with a second example embodiment of the present disclosure with the jack socket in an expanded state.
Figure 13B:
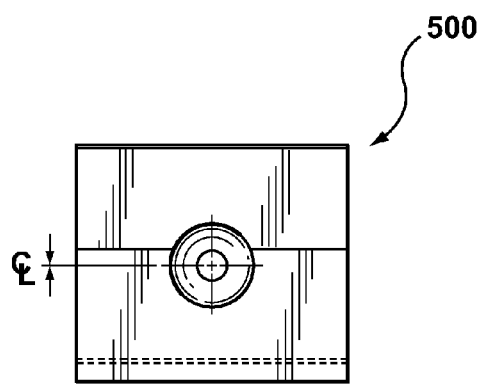
FIG. 13B is an end view of the two-part jack socket of FIG. 13A taken along the line 13B-13B.

In the shown example, the second part 540 is connected to the first part 520 by a hinge 546 so as to pivot between the first position (FIGS. 12A and 12B) and the second position (FIGS. 13A and 13B). The hinge 546 in the shown example is located at the top of the rear end 521 of the first part 520. As in the shown example, the second part 540 may be an L-shaped member having a first elongate portion 541 extending parallel to the longitudinal axis 514 of the jack socket 500 and a second portion 542 at a distal of the first elongate portion 541 away from the hinge 546. The second portion 542 extends perpendicular to the first elongate portion 541 and the longitudinal axis 514 of the jack socket 500. The second portion 542 defines an aperture for 543 receiving the jack plug during insertion.

The first part 520 and second part 540 may be made of a rigid plastic, such as a suitable polycarbonate plastic, and the hinge 546 may be made from a flexible rubber, such as a suitable silicon rubber, or other flexible material. The first part 520 and second part 540 may be fused to together with the hinge 546 to form a single part using a two-shot injection molding process.

The cavity 510 expands from the retracted state to the expanded state in response to insertion of the jack plug. The tip of the jack plug enters the aperture 210 in the side surface 212 of the housing 200 and the aperture 512 in the jack socket 500. As the jack plug proceeds into the cavity 510, its increasing cross-section contacts and displaces the second part 540, acting against the inward restraining force of the flexible casing. This causes the second part 540 to rotate or pivot away from the first part 520 in a direction indicated by the arrow 548 (FIGS. 14A and 15A). Conversely, the cavity 510 contracts from the expanded state to the retracted state in response to removal of an inserted jack plug. As the jack plug is removed from the cavity 510, its decreasing cross-section gradually discontinues acting against the inward restraining force of the flexible casing. The inward restraining force of the flexible casing then biases the second part 540 towards the first part 520, returning it to the first position.

The present disclosure may be embodied in other specific forms without departing from its spirit or essential characteristics. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. An expanding jack socket comprising:
   a first part having a contact surface;
   a second part having a contact surface and being moveable with respect to the first part between a first position and a second position, the contact surface of the first part and the contact surface of the second part defining a cavity, the cavity having a retracted state when the second part is in the first position and an expanded state for receiving a jack plug when the second part is in the second position; and
   one or more contacts located in the contact surface of the first part or the contact surface of the second part.

2. The jack socket of claim 1 wherein the one or more contacts are located in the contact surface of the first part.

3. The jack socket of claim 1 wherein the cavity defines a first cross-sectional area when the cavity is in the expanded state and a second smaller cross-sectional area when the cavity is in the retracted state.

4. The jack socket of claim 1 wherein the cavity is shaped to accommodate an audio plug when in the expanded state.

5. The jack socket of claim 1 wherein the second part is moveable relative the first part in a direction perpendicular to a longitudinal axis of the cavity.

6. The jack socket of claim 1 wherein the second part is adapted for sliding movement relative the first part between the first and second positions.

7. The jack socket of claim 1 wherein one of the first part and the second part includes tracks and the other of the first part and the second part defines grooves for receiving the tracks for sliding movement therein.

8. The jack socket of claim 1 wherein the second part is pivotably connected to the first part so as to pivot between the first position and the second position.

9. The jack socket of claim 1 wherein the second part is connected to the first part by a hinge so as to pivot between the first position and the second position.

10. The jack socket of claim 1 wherein the contact surfaces of the first part and second part are elongate concave surfaces, wherein the cross-sectional area of the cavity in the expanded state is circular and adapted to receive a sleeve of a jack plug.

11. A portable electronic device comprising:
a circuit board;
an expanding jack socket comprising: a first part having a contact surface; a second part having a contact surface and being moveable with respect to the first part between a first position and a second position, the contact surface of the first part and the contact surface of the second part defining a cavity, the cavity having a retracted state when the second part is in the first position and an expanded state for receiving a jack plug when the second part is in the second position; and one or more contacts located in the contact surface of the first part or the contact surface of the second part, wherein the contacts are in electrical communication with the circuit board;
a flexible casing surrounding the jack socket, the flexible casing defining a casing aperture for receiving the jack plug, wherein the casing aperture has a first cross-sectional area when the cavity is in the retracted state and a second cross-sectional area when the cavity is in the expanded state.

12. The portable electronic device in claim 11 further comprising:
a frame to which the circuit board is attached, the flexible casing surrounding the frame and the jack socket.

13. The portable electronic device in claim 11 wherein the flexible casing applies an inward restraining force which releasably secures a received jack plug.

14. The portable electronic device in claim 11 wherein the second part is moveable relative the first part in a direction perpendicular to a longitudinal axis of the cavity.

15. The portable electronic device in claim 11 wherein the second part is adapted for sliding movement relative the first part between the first and second positions.

16. The portable electronic device in claim 11 wherein one of the first part and the second part includes tracks and the other of the first part and the second part defines grooves for receiving the tracks for sliding movement therein.

17. The portable electronic device in claim 11 wherein the second part is pivotably connected to the first part so as to pivot between the first position and the second position.

18. The portable electronic device in claim 11 wherein the second part is connected to the first part by a hinge so as to pivot between the first position and the second position.

19. The portable electronic device of claim 11 wherein the flexible casing is formed of a flexible material which comprises one of urethane, neoprene or silicone rubber.

20. The portable electronic device of claim 11 wherein the second part of the jack socket is formed of a rigid plastic and is co-molded with the flexible casing to form a single integrated part.

* * * * *